(12) United States Patent
Subramaniam et al.

(10) Patent No.: US 8,268,048 B2
(45) Date of Patent: Sep. 18, 2012

(54) OXYGEN BINDING OF NANOPARTICULATE METAL COMPLEXES

(75) Inventors: Bala Subramaniam, Lawrence, KS (US); Andrew S. Borovik, Irvine, CA (US); Chad A. Johnson, Longview, TX (US)

(73) Assignee: University of Kansas, Lawrence, KS (US)

( * ) Notice: Subject to any disclaimer, the term of this patent is extended or adjusted under 35 U.S.C. 154(b) by 390 days.

(21) Appl. No.: 12/578,907

(22) Filed: Oct. 14, 2009

(65) Prior Publication Data

US 2010/0089236 A1 Apr. 15, 2010

Related U.S. Application Data (60) Provisional application No. 61/105,267, filed on Oct. 14, 2008.

(51) Int. Cl.
*B01D 53/04* (2006.01)
(52) U.S. Cl. ..................... 95/138; 252/188.28
(58) Field of Classification Search ............ 95/95, 104, 95/138, 148, 900; 96/108; 252/184, 188.28; 502/20
See application file for complete search history.

(56) References Cited

U.S. PATENT DOCUMENTS

| 4,451,270 | A | * | 5/1984 | Roman | 95/150 |
| 5,296,105 | A | * | 3/1994 | Amatore et al. | 205/633 |
| 5,874,029 | A | | 2/1999 | Subramaniam et al. | |
| 6,436,171 | B1 | * | 8/2002 | Wang et al. | 95/96 |
| 6,517,610 | B1 | * | 2/2003 | de la Houssaye | 95/107 |
| 6,989,044 | B2 | * | 1/2006 | Zhang et al. | 95/90 |
| 2006/0149089 | A1 | | 7/2006 | Malfroy-Camine et al. | |
| 2007/0134338 | A1 | | 6/2007 | Subramaniam et al. | |
| 2007/0138436 | A1 | * | 6/2007 | Stroeks et al. | 252/188.28 |

OTHER PUBLICATIONS

Suzuki et al., *Resonance Raman Spectra, Excitation Profiles, and Infrared Spectra of [Co(salen)$_2$ ]O$_2$ in the Solid State*, Inorg. Chem. 20 1993-1996 (1981).
Hester et al., *Resonance Raman Studies of Transition Metal Peroxo Complexes: 5-The Oxygen Carrier Cobalt(II)-salen and its µ-Peroxo Complexes, [L(salen)Co]$_2$O$_2$; L=DMSO, py, DMF, pyO, and no L*, Journal of Raman Spectroscopy 11 49-58 (1981) [abstract only].
Reverchon, *Supercritical antisolvent precipitation of micro- and nano-particles*, J. Supercritical Fluids 15 1-21 (1999).
Hutchings et al., *Amorphous Vanadium Phosphate Catalysts Prepared using Precipitation with Supercritical CO$_2$ as an Antisolvent*, J. Catalysis, 208 197-210 (2002).
Johnson et al., *Formation of Nanoparticulate Metal Complexes with Compressed Carbon Dioxide*, Abstract for AIChE Fall 2004 Conference held on Nov. 7-12, 2004 [Abstract].
Johnson et al., *Formation of Nanoparticulate Metal Complexes with Compressed CO$_2$*, Annual AIChE meeting Austin, TX, Nov. 10, 2004, PowerPoint Presentation given orally to about 30-50 people over about a 20-minute presentation.

(Continued)

*Primary Examiner* — Frank Lawrence, Jr.
(74) *Attorney, Agent, or Firm* — Stinson Morrison Hecker LLP (57) ABSTRACT

Solid nanoparticulate transition metal complexes of Co(II) salen exhibit reversible oxygen absorption in a near stoichiometric manner. In contrast, no measurable oxygen binding was observed with unprocessed Co(II) salen.

21 Claims, 4 Drawing Sheets

OTHER PUBLICATIONS

McLeod et al., *Metallic Nanoparticle production Utilizing a Supercritical Carbon Dioxide Flow Process*, Langmuir 20 7078-7082 (2004).

Johnson et al., *Nanoparticulate Metal Complexes Prepared with Compressed Carbon Dioxide: Correlation of Particle Morphology with Precursor Structure*, J. Amer. Chem. Soc. 127 9698-9699 (2005).

Johnson et al., *Enhanced $O_2$ Binding in Co(salen) Nanoparticles: Characterization by In Situ Infrared and X-ray Absorption Spectroscopies*, J. Physical Chemistry C. 112:12272-12281 (2008).

* cited by examiner

OXYGEN BINDING OF NANOPARTICULATE METAL COMPLEXES

CROSS-REFERENCE TO RELATED APPLICATIONS

This application is based on and claims priority to U.S. Provisional Application Ser. No. 61/105,267, filed on Oct. 14, 2008, which is incorporated herein by reference.

STATEMENT REGARDING FEDERALLY SPONSORED RESEARCH OR DEVELOPMENT

The present invention was sponsored by the National Science Foundation Grant No. EEC-0310689, and the government may have certain rights in the invention.

BACKGROUND OF THE INVENTION

Much of the work on oxygen ($O_2$)-binding transition metal complexes has been guided by attempts to mimic biological oxygen carriers. See Niederhoffer et al., *Thermodynamics of Oxygen Binding in Natural and Synthetic Dioxygen Complexes*, Chemical Reviews 84 137-203 (1984); Norman et al., *Reversible Complexes For the Recovery of Dioxygen*, in *Oxygen Complexes and Oxygen Activation by Transition Metals*, Martell and Sawyer Eds. Plenum Press: New York 107-125 (1988); Jones et al., *Synthetic Oxygen Carriers Related to Biological Systems*, Chemical Reviews 79 139-179 (1979); Li et al., *Separation of Oxygen from Air Using Coordination Complexes: A Review*, Industrial Eng. Chem. Res. 33 755-783 (1994). Cobaltous bis(salicylaldehyde)ethylenediamine ("Co(salen)") and its derivatives are one class of complexes that have been extensively studied for their ability to reversibly bind oxygen. See Pfeiffer et al., *Tricyclic ortho-condensed partial valence rings*, Justus Liebigs Ann. Chem. 503 84-130 (1933); Tsumaki, *Coordinate valency rings. IV. Some inner complex salts of hydroxyaldimines*, Bulletin of the Chemical Society of Japan 13 252-260 (1938); Bailes et al., *The Oxygen-Carrying Synthetic Chelate Compounds. VII. Preparation*, Journal of the Amer. Chem. Soc. 69 1886-1893 (1947). Co(salen) is the first reported synthetic reversible Co(II) oxygen carrier to bind oxygen in the solid state, and it is believed that the $O_2$ adduct consists of dimeric [Co(salen)]$_2O_2$ units. See Suzuki et al., *Resonance Raman Spectra, Excitation Profiles, and Infrared Spectra of [Co(salen)$_2$]O$_2$ in the Solid State*, Inorg. Chem. 20 1993-1996 (1981); Hester et al., *Resonance Raman Studies of Transition Metal Peroxo Complexes: 5-The Oxygen Carrier Cobalt(II)-salen and its µ-Peroxo Complexes, [L(salen)Co]$_2O_2$: L=DMSO, py, DMF, pyO, and no L*, Journal of Raman Spectroscopy 11 49-58 (1981). However, there are several polymorphs of Co(salen), with only a few having the ability to bind oxygen. See Suzuki et al., *Resonance Raman Spectra, Excitation Profiles, and Infrared Spectra of [Co(salen)$_2$]O$_2$ in the Solid State*, Inorg. Chem. 20 1993-1996 (1981); Delasi et al., *The Crystal Structure of the Oxygen-Inactive Form of Bis(salicyladehyde)ethylenediiminecobalt(II)*, Inorg. Chem. 10 1498-1500 (1971). Formation of the different polymorphs is dependent on the preparative method, and heating and grinding can lead to interconversion between $O_2$ active and inactive forms. See Suzuki et al., *Resonance Raman Spectra, Excitation Profiles, and Infrared Spectra of [Co(salen)$_2$]O$_2$ in the Solid State*, Inorg. Chem. 20 1993-1996 (1981). Furthermore, a significant increase in oxygen affinity occurs when an additional ligand is coordinated to the Co(salen) complexes; for example, the formation of five-coordinate square pyramidal complexes promotes oxygen binding. See Li et al., *Separation of Oxygen from Air Using Coordination Complexes: A Review*, Industrial Eng. Chem. Res. 33 755-783 (1994); Sharma et al., *Design, Synthesis, and Characterization of Templated Metal Sites in Porous Organic Hosts: Application to Reversible Dioxygen Binding*, J. Amer. Chem. Soc. 122 8946-8955 (2000).

Cobalt-$O_2$ carriers have been studied for a variety of applications in the solid state, focusing on oxygen separation and storage. See Norman et al., *Reversible Complexes For the Recovery of Dioxygen*, in *Oxygen Complexes and Oxygen Activation by Transition Metals*, Martell and Sawyer Eds. Plenum Press: New York 107-125 (1988); Li et al., *Separation of Oxygen from Air Using Coordination Complexes: A Review*, Industrial Eng. Chem. Res. 33 755-783 (1994). Compared to iron complexes, such as those with porphyrin ligands, cobalt complexes have shown more potential as oxygen sorbents for air separation. See Norman et al., *Reversible Complexes For the Recovery of Dioxygen*, in *Oxygen Complexes and Oxygen Activation by Transition Metals*, Martell and Sawyer Eds. Plenum Press: New York 107-125 (1988); Li et al., *Separation of Oxygen from Air Using Coordination Complexes: A Review*, Industrial Eng. Chem. Res. 33 755-783 (1994); Meier et al., *Tetrabutylammonium Tetracyanocobaltate(II) Dioxygen Carriers*, Inorg. Chem. 36 1707-1714 (1997); Hutson et al., *Synthesis and Characterization of the Sorption Properties of Oxygen-Binding Cobalt Complexes Immobilized in Nanoporous Materials*, Industrial Eng. Chem. Res. 39 2252-2259 (2000). Co(salen) complexes and its derivatives have been extensively studied for this application. See Li et al., *Separation of Oxygen from Air Using Coordination Complexes: A Review*, Industrial Eng. Chem. Res. 33 755-783 (1994). For example, the U.S. Air Force attempted to use the compound to sequester oxygen from air but technical obstacles, including slow oxygenation rates, irreversible oxidation, and sensitivity to moisture have hampered successful utilization. See Li et al., *Separation of Oxygen from Air Using Coordination Complexes: A Review*, Industrial Eng. Chem. Res. 33 755-783 (1994).

Some polymorphs of Co(salen) and its derivatives have been used as homogeneous oxidation catalysts in solution. See Wei et al., *$CO_2$-Expanded Solvents: Unique and Versatile Media for Performing Homogeneous Catalytic Oxidations*, J. Amer. Chem. Soc. 124 2513-2517 (2002); Musie et al., *Autoxidation of Substituted Phenols Catalyzed by Cobalt Schiff Base Complexes in Supercritical Carbon Dioxide*, Inorg. Chem. 40 3336-3341 (2001). Some polymorphs of Co(salen) and its derivatives have also been used as oxygen carriers (see Sharma et al., *Design, Synthesis, and Characterization of Templated Metal Sites in Porous Organic Hosts: Application to Reversible Dioxygen Binding*, J. Amer. Chem. Soc. 122 8946-8955 (2000)) and as catalysts in porous polymeric hosts (see Sharma et al., *Immobilized metal complexes in porous hosts: catalytic oxidation of substituted phenols in $CO_2$ media*, Green Chemistry 8 972-977 (2006) and Welbes et al., *Confinement of Metal Complexes within Porous Hosts: Development of Functional Materials for Gas Binding and Catalysis*, Accounts of Chem. Res. 38 765-74 (2005)). The complexes are sequestered in templated polymers to isolate the metal centers, thereby avoiding dimerization and improving the stability of the complex. See Sharma et al., *Design, Synthesis, and Characterization of Templated Metal Sites in Porous Organic Hosts: Application to Reversible Dioxygen Binding*, J. Amer. Chem. Soc. 122 8946-8955 (2000); Hutson et al., *Synthesis and Characterization of the Sorption Properties of Oxygen-Binding Cobalt Complexes Immobilized in Nanoporous Materials*, Industrial Eng. Chem. Res. 39 2252-2259 (2000). More recently, nanoparticles of transition metal complexes, including Co(salen), were prepared using precipitation with compressed antisolvent ("PCA") technology. In general, nanoparticles of Co(salen) were precipitated from methylene chloride solution using supercritical carbon dioxide as an antisolvent. See Johnson et al., *Nanoparticulate Metal Complexes Prepared with Compressed Carbon Dioxide: Correlation of Particle Morphology with Precursor Structure*, J. Amer. Chem. Soc. 127 9698-9699 (2005); Subramaniam et al., U.S. Patent Application No. 2007/0134338, which are incorporated by reference. This was the first time that nanoparticles of such complexes have been prepared. In addition, the ability of such complexes to absorb oxygen was not known or investigated.

BRIEF SUMMARY OF THE INVENTION

In the present invention, the oxygen binding properties of nanoparticulate solid transition metal complexes was investigated. In particular, it was demonstrated for the first time that Co(salen) nanoparticles show an oxygen binding capacity while the unprocessed Co(salen) does not. Moreover, the Co(salen) and oxygen binding is reversible and exhibits a 1:2 stoichiometric binding ratio of oxygen to Co(salen)

In one aspect, the present invention is directed to a process for removing oxygen ($O_2$) from a gaseous system comprising oxygen. The process comprises exposing the gaseous system to a nanoparticulate solid transition metal complex absorbent capable of absorbing oxygen at a temperature less than about 100° C., more preferably less than about 50° C., and most preferably less than about room temperature.

In another aspect, the nanoparticulate solid transition metal complex absorbent is a nanoparticulate Co(II) salen complex. It is preferably produced by precipitation from an organic solution with a compressed anti-solvent. Supercritical carbon dioxide is preferably used as the anti-solvent as set forth in Subramaniam et al., U.S. Patent Application No. 2007/0134338. Thus, nanoparticulate solid transition metal complex absorbent is formed by a process comprising the steps of: providing a transition metal complex; forming a solution including at least one solvent and the transition metal complex; spraying the solution containing the solvent and the transition metal complex through a nozzle into an antisolvent; generating atomized droplets of the solution; and contacting droplets with the antisolvent to form a nanoparticulate solid transition metal complex.

In yet another aspect, the solid transition metal complex is comprised of a transition metal complexed with a salen, saltin, salophen, or salcyhexen ligand. For example, the solid transition metal complex may be a nickel, cobalt, iron, or ruthenium salen. The nanoparticles of the solid transition metal complex may be rods or spheres, depending upon the underlying molecular geometry (planar versus non-planar). In yet a further aspect, the nanoparticulate solid transition metal complex absorbent may have a tetrahedral-like molecular geometry.

In another aspect of the present invention, the nanoparticulate solid transition metal complex absorbent absorbs oxygen in a near-stoichiometric manner. For example, the nanoparticles of cobalt salen complex absorbed about one oxygen ($O_2$) molecule per two cobalt salen complex molecules.

In yet another aspect, the nanoparticulate solid transition metal complex absorbent absorbs about 3%, 4%, or 5 wt % (or some range therebetween) oxygen based on the overall weight of the nanoparticulate solid transition metal complex absorbent.

In still another aspect, the absorption of oxygen by the nanoparticulate solid transition metal complex absorbent is reversible. Thus, the present invention is also directed to a process to regenerate a nanoparticulate solid transition metal complex absorbent having oxygen absorbed thereon comprising the step selected from the group consisting of (a) heating said absorbent (typically between about 30 and 100° C.) at a pressure less than about 5 bar (preferably less than 4, 3, 2, or 1 bar), (b) decreasing the pressure of the absorbent to about 0.01 bar or less at a temperature of 120° C. or less, or (c) purging the absorbent with an inert gas. Suitable inert gases include nitrogen, argon, or combinations thereof.

In general, the nanoparticulate solid transition metal complex oxygen carriers have a high reversible equilibrium capacity for oxygen and a relatively low affinity for nitrogen. Additionally, it is anticipated that the absorbents retain these properties in oxygen recovery applications over a long period of time.

The nanoparticulate solid transition metal complex oxygen-sorbent compositions are especially suitable for use in both pressure swing absorption (PSA) and temperature swing absorption (TSA) processes for the separation of gaseous mixtures, such as air, to recover oxygen or nitrogen or both.

The nanoparticles are well adapted for use in both oxygen absorption and oxygen desorption processes. Thus, in general, the present invention is directed to process for removing oxygen from a gaseous feed stream containing oxygen and at least one other component. The process comprises the steps of bringing the gaseous feed stream containing oxygen into contact with a solid state composition comprising the nanoparticulate solid transition metal complex absorbent, such that the absorbent selectively and reversibly binds oxygen thereby removing oxygen from the gaseous feed stream. The process then comprises the step of increasing the temperature of the nanoparticulate solid transition metal complex absorbent, decreasing the pressure or the partial pressure of the oxygen in the gas flowing past the nanoparticulate solid transition metal complex absorbent, purging the nanoparticulate solid transition metal complex absorbent with a purge gas stream, or a combination thereof in order to release at least a portion of the oxygen from the absorbent. For example, two fixed bed absorbers having the nanoparticulate solid transition metal complex absorbents can be used in a cyclical fashion as absorber/desorber units. The gaseous feed stream is brought into contact with the first absorber bed to remove oxygen from the gaseous feed stream. A purge gas stream is brought into contact with the second absorber bed. Then, the gaseous feed stream is brought into contact with the second absorber bed, and the purge gas stream is brought into contact with the first absorber bed to desorb oxygen removed from the nanoparticulate solid transition metal complex absorbent in the first absorber bed during the first part of the cycle.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

The present invention is directed to a process for removing oxygen from air or other non-air gaseous systems having oxygen therein by exposing the gaseous system to nanoparticulate solid transition metal complex absorbent. The nanoparticulate solid transition metal complex is capable of absorbing oxygen, preferably at a temperature less than about 100° C. The nanoparticulate solid transition metal complex is preferably capable of absorbing oxygen from the gaseous system at a temperature less than about 90, 80, 70, 60, 50, 40, 30, or 25° C., most preferably at about room temperature.

The amount of oxygen absorbed with depend on the specific nanoparticulate solid transition metal complex, but is preferably about 5%, 4%, or 3% oxygen based on the weight of the absorbent mass. Moreover, the absorption preferably occurs in a near-stoichiometric manner. As used herein, the term "sorb" or "absorption" is understood to include absorption, adsorption, imbibition, and chemisorption.

The nanoparticulate solid transition metal complexes are preferably prepared using precipitation with compressed antisolvent ("PCA") technology. The PCA technique is a semi-continuous method that regularly utilizes a supercritical fluid, such as supercritical carbon dioxide, as the precipitant. Exemplary PCA techniques are set forth in Subramaniam et al., U.S. Pat. No. 5,874,029 and U.S. Patent Application No. 2007/0134338, which are both incorporated by reference. See also Subramaniam et al., *Pharmaceutical processing with supercritical carbon dioxide*, J. Pharm. Sci., 86 885-890 (1997); Perrut, *Supercritical fluids applications in the pharmaceutical industry*, STP Pharma Sciences, 13 83-91 (2003); Foster et al., *Processing pharmaceutical compounds using dense-gas technology*, J. Ind. Eng. Chem. Res., 42 (25), 6476-6493 (2003); Rehman et al., *Optimisation of powders for pulmonary delivery using supercritical fluid technology*. Eur. J. Pharm. Sci., 22 (1), 1-17 (May 2004). In general, during processing, carbon dioxide dissolves into a solution of the desired compound as the solvent diffuses out. See Lin et al., *Vapor-liquid mass transfer during gas antisolvent recrystallization: Modeling and experiments*, Ind. Eng. Chem. Res. 42 2171 (2003). Because of the greater precipitant-solvent ratio and efficient mass transfer, substantial supersaturation is achieved, resulting in the production of small, relatively uniform particles of the dissolved compound.

As used herein, the term "supercritical fluid" means either a fluid simultaneously above its critical temperature ($T_c$) and pressure ($P_c$), or a fluid suitable for use as a supercritical antisolvent. In the practice of the present invention, and as used herein, "supercritical fluid" means the temperature of the fluid is in the range of 1.01 $T_c$ to 5.0 $T_c$ and the pressure of the fluid is in the range of 1.01 $P_c$ to 8.0 $P_c$. In a most preferred embodiment, the temperature of the fluid is in the range of 1.01 $T_c$ to 1.2 $T_c$ and the pressure of the fluid is in the range of 1.01 $P_c$ to 2.0 $P_c$.

As used herein, the term, "nanoparticle" or "nanoparticulate" means a particle having at least one dimension that is less than about 1 micron, preferably less than 500 nm, still more preferably less than 200 nm, and most preferably less than 100 nm. An example of a "nanoparticle" is a generally spherical particle with a diameter less than 1 micron. Another example of a "nanoparticle" is a rod-like elongated structure having a diameter of about 1 to 10 nm, but a length greater than 1 micron. Because at least one dimension is less than 1 micron, the rod-like structure satisfies the nanoparticle definition.

As used herein, the term "transition metal complex" means a discrete molecule that contains a transition metal ion and a ligand. In one aspect, the metal complexes are coordination compounds. In another aspect, the metal complexes are "organometallic complexes," meaning that the complex is between the transition metal ion and a carbon on a ligand comprising a carbon-containing compound.

Suitable transition metals for forming the metal complex starting materials of the present invention include the transition metals, e.g., Co, Cr, Fe, V, Mg, Ni, Ru, Zn, Al, Sc, Zr, Ti, Sn, La, Os, Yb, and Ce. Preferred transition metal ions are selected from the group consisting of manganese, nickel, cobalt, iron, and ruthenium.

The nanoparticulate solid transition metal complexes having the oxygen absorption properties of the present invention may be any suitable particle morphology. For example, the nanoparticles may be generally spherical in shape and have an average diameter less than about 500 nm, 300 nm, 200 nm, 100 nm, 80 nm, 50 nm, 40 nm, 30 nm, or 10 nm. Alternatively, the nanoparticulate solid transition metal complexes having the oxygen absorption properties of the present invention may be elongated rod-like structures. In one aspect, the average length of the rod is greater than 1 micron, but the average diameter. is on the order of about 200 nm. In still another aspect, the elongated rod-like structure has a submicron length and an average diameter less than about 100 nm. In yet another aspect, the elongated rod-like structure has an average length of about 700 nm, and an average diameter of about 85 nm.

The transition metal may be complexed to a bidentate, tridentate, tetradentate, or other multidentate ligand. In a preferred aspect, the transition metal is complexed to a tetradentate ligand. Exemplary ligands include organic molecules, such as salens, metalloporphyrin, phthalocyanine, macrocyclic teraaza, and cyclam-type ligand systems as set forth in Cuellar et al., U.S. Pat. No. 4,668,349, and Wang et al., U.S. Pat. No. 6,436,171, which are incorporated by reference. Most preferably, the ligand is a "salen." The term "salen" is a contraction used to refer to those ligands typically formed through a salicylic aldehyde derivative with one molecule of a diamine derivative. While salen ligands are formed from ethylenediamine derivatives, propyl and butyl diamines may also be used to give analogous salpn and salbn derivatives. Exemplary ligands for complexing the metals are set forth in U.S. Pat. Nos. 5,665,890, 5,929,232, 5,663,393, and 5,637,739, all to Jacobsen et al., which are incorporated by reference, and Lui et al., U.S. Pat. No. 6,693,206, which is incorporated by reference.

In the most preferred embodiment of the invention, the transition metal complex comprises a transition metal anion (preferably Mn, Ni, Ru, Co) and an organic ligand selected from N,N'-bis(salicylaldehyde/substituted salicylaldehyde) ethylenediimine (salen), N,N'-bis(salicylaldehyde/substituted salicylaldehyde) 1,3-propylenediimine (saltin), N,N'-bis(salicylaldehyde/substituted salicylaldehyde) 1,2-phenylenediimine (salophen or salph), N,N'-bis(salicylaldehyde/substituted salicylaldehyde) 1,2-cyclohexane diimine (salcyhexen), and their unsubstituted or substituted derivatives. Suitable methods of substituting and altering the molecular structure of these ligands and the corresponding metal complexes is set forth in U.S. Pat. Nos. 5,665,890, 5,929,232, 5,663,393, and 5,637,739, all to Jacobsen et al., which are incorporated by reference, and Lui et al., U.S. Pat. No. 6,693,206, which is incorporated by reference.

Most preferred metal complexes are those selected from the group consisting of [N,N'-ethylenebis(salicylidene-aminato(2-)]cobalt(II) (hereinafter referred to as "Co(II)(salen)"); [N,N'-ethylenebis(salicylidene-aminato(2-)]nickel(II) (hereinafter referred to as "Ni(II)(salen)"); and [N,N'-Bis(3,5-di-tert-butylsalicylidene)1,2-cyclohexanediaminato(2-)]nickel(II) (hereinafter referred to as "Ni(salen*)"). See Jones et al., Chem. Rev. 79 139-179 (1979); Niederhoffer et al., *Thermodynamics of oxygen binding in natural and synthetic dioxygen. complexes*, Chem. Rev. 84 137-203 (1984); Norman et al., (Eds.), *Oxygen Complexes and Oxygen Activation by Transition Metals*, 107-127 (1988); Jacobsen, *Asymmetric Catalysis of Epoxide Ring-Opening Reactions*, Acc. Chem. Res. 33 421-431 (2000).

The nanoparticles of the present invention may also be deposited on a solid support. In general, the solid supports for use fall into three general categories. First, there are oxide solid supports such as alumina, zinc oxide, silica, thoria, titania, and zirconia. Second, there are solid supports which are useful in catalysis because they form small cavities in which only one or a few nuclear units of the metal oxide catalyst will fit thereby increasing the dispersion of the catalyst by segregating the nuclear units through entrapment in these small cavities. Zeolites are one example of such a solid support. Other examples include pillared clays and sols. This would include both naturally occurring and synthetic sols. A sol is a substance, whether gas, liquid or solid, dispersed in a continuous gas, liquid or solid medium; the system of the dispersed and continuous phases. In the context of a solid support, an example is silica gel (hydrated silica). It is neither a solution nor a suspension. Both zeolites and sols are naturally occurring although they can also be prepared synthetically. An example of a natural zeolite is Faujasite. The third category of solid supports are inert supports such as carbon, carbon fiber, glass, metals, and microcrystalline cellulose.

After the nanoparticulate solid transition metal complex absorbs the oxygen, the oxygen may be desorbed by heating the nanoparticles, decreasing the pressure, or purging the nanoparticles with an inert gas. Desorption generally begins at temperatures greater than about 30° C., but may occur at higher temperatures, e.g., those above 40, 50, 60, 70, 80, 90, and 100° C. or some range therebetween. Likewise, desorption of the oxygen from the nanoparticulate solid transition metal complex may be achieved by decreasing the pressure. Typically, lower oxygen pressures or partial pressures are required to desorb the oxygen from the nanoparticulate solid transition metal complex. Typically, the pressure is decreased 0.01 bar or less, and preferably to about 0.005 bar or less. Lastly, desorption of oxygen from the nanoparticulate solid transition metal complex may occur by purging with an inert gas, such as nitrogen or argon.

The solid state nanoparticulate metal complexes react with oxygen to selectively absorb the gas and thus permit its separation and recovery from air or other gaseous mixtures. It is also contemplated that the solid state nanoparticles may also be used to remove oxygen from oxygen-containing fluids, provided that the nanoparticles remain intact and do not dissolve in the liquid phase. The process is operated by simply bringing an oxygen-containing fluid stream into contact with the solid state compositions, such as in typical temperature or pressure swing adsorption processes, although the present process can be used in any separation process designed for separating and/or scavenging oxygen, even in trace amounts, from a gaseous mixture. Specific applications for this type of process include the separation of oxygen from gas streams containing oxygen and nitrogen, such as air, and for the separation of trace amounts of oxygen from a stream comprising predominantly nitrogen or argon. The solid state complexes are used to reversibly bind oxygen, thereby allowing the sorbed oxygen to be recovered, and the nanoparticulate sorbent (complex) to be regenerated by heating or by reducing the oxygen partial pressure over the adduct.

The following examples are provided by way of explanation and illustration. As such, these examples are not to be viewed as limiting the scope of the invention.

Materials and Methods

In the following examples, Co(salen) was purchased from Sigma-Aldrich and used as received. SEM characterization revealed that the particle size of this material was on the order of tens to hundreds of microns. Co(salen) nanoparticles were created as explained previously with a smaller precipitation vessel (0.95 L) as well as a SCEPTER® (Graver Separations) (0.1 µm) filter. See Johnson et al., *Nanoparticulate Metal Complexes Prepared with Compressed Carbon Dioxide: Correlation of Particle Morphology with Precursor Structure*, J. Amer. Chem. Soc. 127 9698-9699 (2005). The oxygen used for the TGA studies was USP medical grade from Linweld while the $N_2$ utilized was boiled off from a liquid nitrogen dewar. The oxygen and helium utilized for the Rubotherm adsorption experiments were obtained from Pangas AG (Luzern, Switzerland) at purities of 99.95% and 99.999%, respectively. Argon for the TPD experiments was high purity grade (99.996%) from Linweld.

EXAMPLE 1

Physical Properties of Unprocessed Co(salen) and Nanoparticulate Co(salen)

In this example, the physical properties of unprocessed Co(salen) nanoparticulate Co(salen) formed according to Subramaniam et al., U.S. Patent Application No. 2007/0134338 were investigated. The electron paramagnetic resonance and electronic absorbance spectroscopies', and elemental analysis ("ICP") characterizations of the unprocessed and the processed nanoparticulates of the Co(salen) produced similar spectral and analytical results, demonstrating that the metal complexes remain intact following precipitation. See Johnson et al., *Nanoparticulate Metal Complexes Prepared with Compressed Carbon Dioxide: Correlation of Particle Morphology with Precursor Structure*, J. Amer.

Chem. Soc. 127 9698-9699 (2005). In this example, the physical properties of the nanoparticles were further characterized.

More specifically, the true (skeletal) density analysis of both the commercial Co(salen) as well as Co(salen) nanoparticles was performed by Quantachrome Instruments using a gas-expansion pycnometer. Specific surface area and pore volume analyses of both materials were performed by NanoScale Materials Inc.

As shown in Table 1, the true density of the nanoparticles is lower than that of the unprocessed Co(salen) by about 0.3 g/mL (18%). In addition, there were significant differences in the surface areas and pore volumes between the unprocessed and nanoparticulated forms of Co(salen) (Table 1). In particular, the Brunauer Emmett Teller (BET) measurements suggest that the nanoparticles of Co(salen) are porous, having an average pore volume of $30 \times 10^{-3}$ mL/g of nanoparticles and mean pore diameter of 6-8 nm. The porosity is consistent with the lower true density of the nanoparticles.

TABLE 1

Physical properties of unprocessed and Co(salen) nanoparticles

|  | True Density (g/cc) | Surface Area ($m^2$/g) | Pore Volume ($10^{-3}$ mL/g) | Avg. Pore Diameter (A) |
|---|---|---|---|---|
| Commercial Co(salen) | 1.6111 | too low to be measured | 0.4 | 0 |
| Co(salen) nanoparticles | 1.3157 | 14-18 | 29-31 | 67-82 |

EXAMPLE 2

Temperature Programmed Desorption ("TPD")

The Co(salen) nanoparticles displayed a visible color change from brown to green upon exposure to air. In contrast, the unprocessed starting Co(salen) complex did not show any such color change when exposed to air. To determine whether this color change was caused by enhanced oxygen binding, a temperature programmed desorption ("TPD") study was carried out on both samples after exposure to ambient oxygen.

More specifically, TPD of the materials was carried out using argon at 30 sccm. The powders (306 mg of the commercial Co(salen) and 8.3 mg of the Co(salen) nanoparticles) were loaded in a fixed bed arrangement into a quartz tube reactor and heated from room temperature to 200° C. at 5° C. per minute for the Co(salen) nanoparticles and 6.7° C. per minute for the commercial Co(salen). The effluent gases were analyzed using a Pheiffer Vacuum mass spectrometer (Omnistar Quadrupole Mass Spectrometer Model GSD 300 02).

Figure 1:
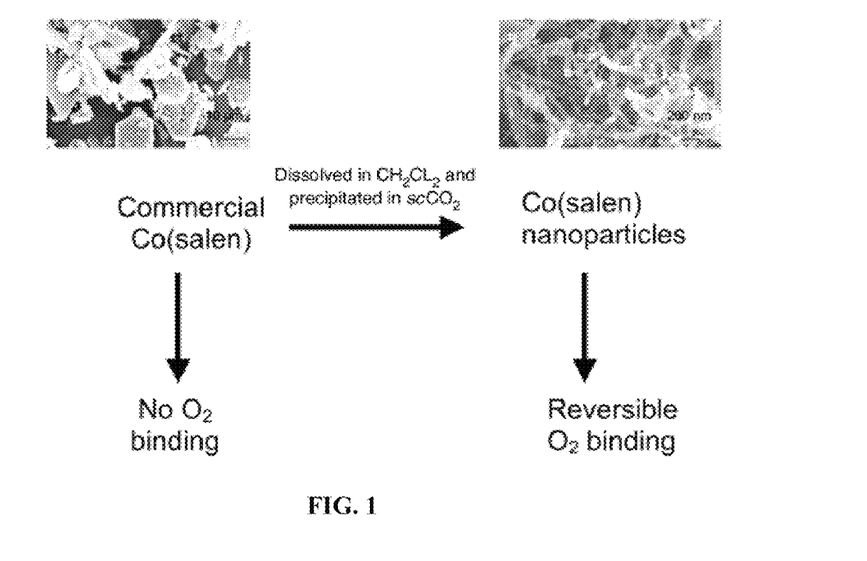
FIG. 1 is a schematic showing the morphology and functional properties of Co(salen) recrystallized as nanoparticles.
Figure 2:
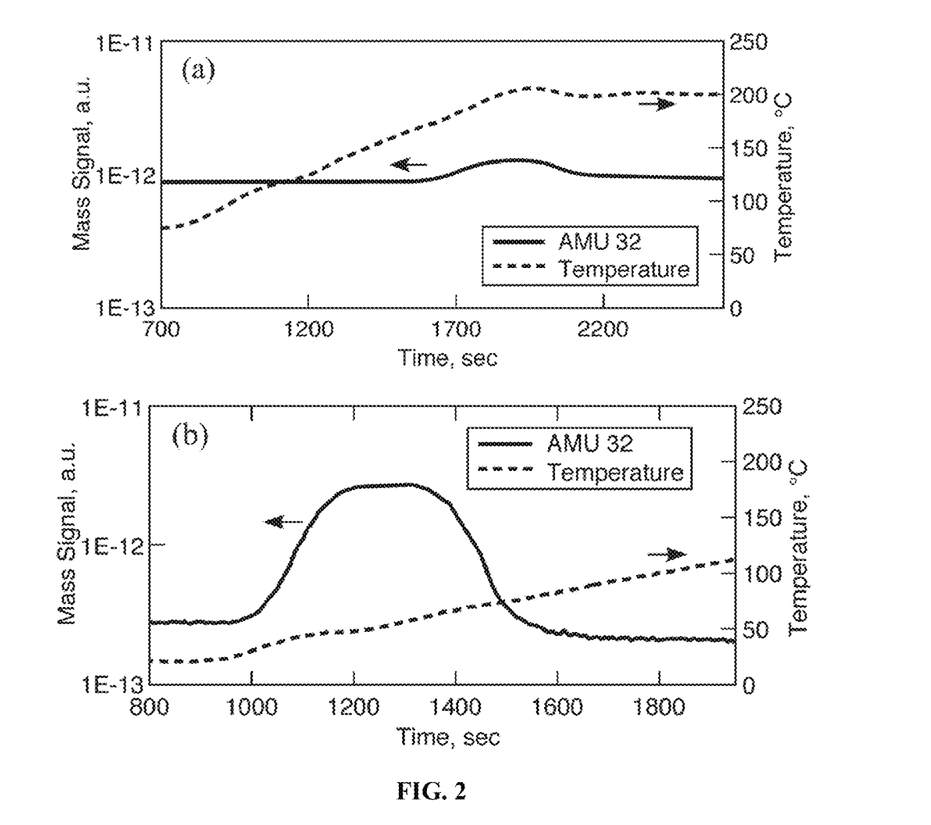
FIG. 2 represents temperature programmed desorption ("TPD") profiles displaying mass signal, atomic mass unit ("AMU") 32 ($O_2$) (-) and furnace temperature ramp (--): (a) commercial Co(salen); and (b) air-exposed Co(salen) nanoparticles.

As shown in FIG. 2, the Co(salen) nanoparticles exhibited substantial oxygen desorption beginning around 30 to 35° C., whereas the unprocessed analog only displayed slight oxygen desorption at temperatures approaching 175° C. The observed TPD signal for the commercial Co(salen) is approximately an order of magnitude lower than the corresponding signal for the Co(salen) nanoparticles even though the amount of commercial Co(salen) used in the experiments is an order of magnitude greater than the Co(salen) nanoparticles. Thus, when normalized with the amount of Co(salen) used in the TPD experiments, the mass of oxygen desorbed on the commercial Co(salen) is so low compared to that on the Co(salen) nanoparticles that additional experiments will be needed to reliably establish the intrinsic amount of oxygen desorbed from the commercial Co(salen). Yet, the TPD experiments demonstrated that the bound oxygen in Co(salen) nanoparticles can indeed be desorbed with gentle heating.

EXAMPLE 3

Thermogravimetric Analysis ("TGA")

Figure 3:
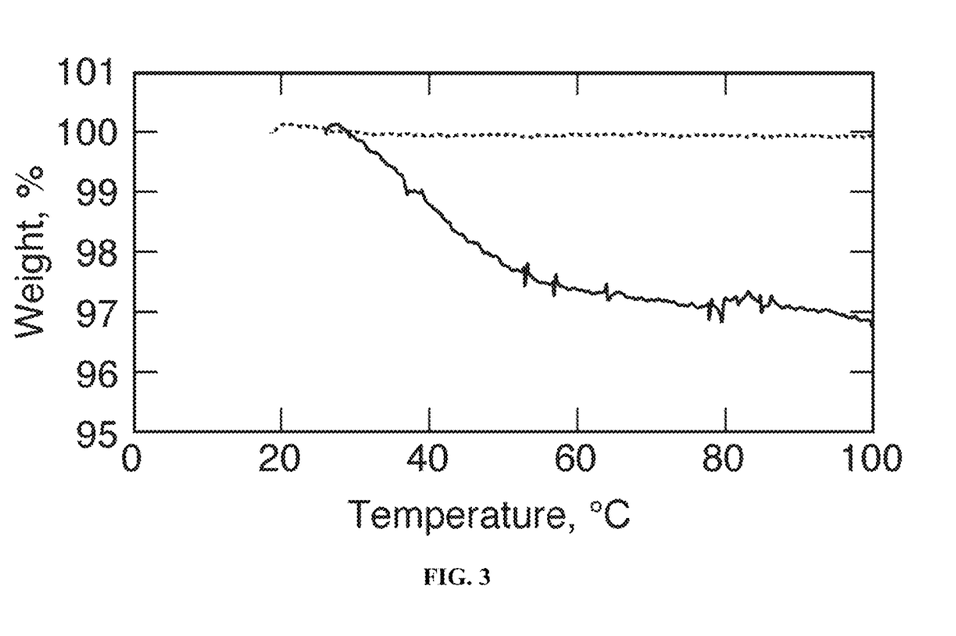
FIG. 3 represents thermogravimetric analysis ("TGA") desorption profiles corresponding to air-exposed commercial Co(salen) (--) and Co(salen) nanoparticles (-).

In this example, thermogravimetric analysis was utilized to further quantify the amount of oxygen bound to the samples. The oxygen desorption data were collected with a TA Instruments Q50 Series Thermogravimetric Analyzer with a heating rate of 5° C. per minute and balance and sample flowrates of 40 and 60 sccm respectively. For the nanoparticle exposed to air, there was a 3% to 4% mass decrease with oxygen desorption starting at 32° C. (FIG. 3). As control, the unprocessed Co(salen) was investigated and no mass change was observed as the sample was heated to 100° C.

To obtain additional quantitative information on the oxygen binding, including whether it is a reversible process, the TGA instrument was modified so that oxygen could be passed through the furnace in a continuous fashion. The sample (1.192-9.335 mg of the commercial Co(salen) and 0.717-2.245 mg of the Co(salen) nanoparticles) was first equilibrated to 60° C. and held there for at least five minutes (see FIG. 4, t=about 0 to 15 minutes) to desorb any $O_2$ that had bound during air exposure (see FIG. 4). This caused mass losses between 4% and 5%. Then, the furnace was cooled to 25° C. and held for an additional five minutes (see FIG. 4, t=about 15 to 30 minutes). The furnace was then cooled to room temperature (see FIG. 4, t=about 30 to 40 minutes). Following this step, the sample gas was changed automatically from the standard $N_2$ to $O_2$ (60 sccm). Pure oxygen was continuously flowed through the furnace for approximately 30 minutes at room temperature (see FIG. 4, t=about 40 to 70 minutes). After a 30 minute $O_2$ pulse, it was found that the mass change leveled off and the sample gas was switched back to $N_2$ (see FIG. 4, t=about 70 to 120 minutes).

Figure 4:
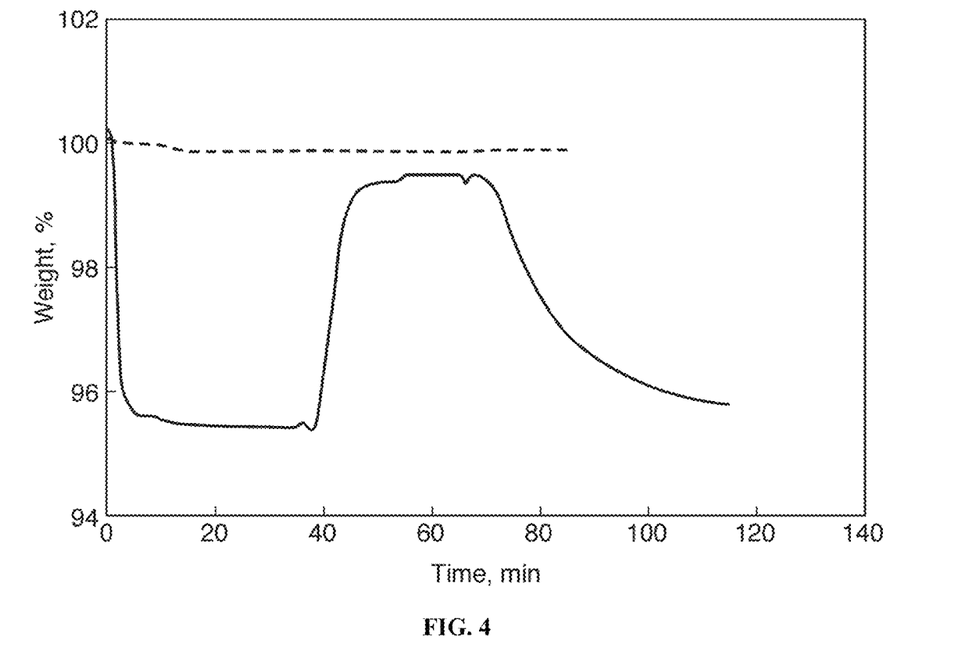
FIG. 4 represents TGA profiles showing oxygen desorption into flowing $N_2$ (at 60° C.) followed by subsequent (around 30 minutes) adsorption from flowing oxygen stream at room temperature (about 20° C.), commercial Co(salen) (--) and Co(salen) nanoparticles (-).

As illustrated in FIG. 4, the nanoparticles showed rapid oxygen uptake that ranged from 3 to 4% of the absorbent mass, corresponding to an oxygen adsorption of 1.27 mmol of $O_2$/g of nanoparticle. Following the prolonged $O_2$ exposure, $N_2$ was purged through the furnace, causing the bonded oxygen to desorb. The control experiments with unprocessed Co(salen) showed no measurable gas adsorption.

EXAMPLE 4

Static Oxygen Adsorption (Quantifying Oxygen Adsorption and Desorption)

To corroborate the TGA results from Example 3, the unprocessed Co(salen) complex and the nanoparticulate Co(salen) were analyzed for static oxygen adsorption at 25° C. using a Rubotherm magnetic suspension balance (Rubotherm, Bochum, Germany), equipped with a calibrated sinker for an in situ measurement of the fluid density (see Dreisbach et al., *Magnetic suspension balance for simultaneous measurement of a sample and the density of the measuring fluid*, J. Thermal Analysis and Calorimetry 62 515-521 (2000)). This experiment utilizes different pressures of oxygen, with equilibrium being indicated by a negligible rate of mass change. The Rubotherm balance allows one to measure the weight of the sample with an accuracy of 0.01 mg and can be operated at pressures and temperatures up to 450 bar and 250° C., respectively. The measuring cell is kept at a constant temperature with a heating jacket and temperature is measured with a calibrated thermocouple at an accuracy 0.1° C. Pressure is measured using a pressure sensor PAA-35×HTT (Keller, Winterthur, Switzerland), which can measure up to 3 bar with an accuracy of 0.15% FS. More details of the experimental setup in Di Giovanni et al., *Adsorption of Supercritical Carbon Dioxide on Silica*, Langmuir 17 4316-4321 (2001) and Pini et al. *Reliable measurement of near-critical adsorption by gravimetric method*, Adsorption 12 393-403 (2006).

The sorbent samples (1728.38-1776.01 mg of the commercial Co(salen) and 166.83 mg of the Co(salen) nanoparticles) were kept in sealed glass beakers under an Argon atmosphere and were regenerated for at least four hours under vacuum at 60° C. or 120° C. before being used in the adsorption measurements. After regeneration, the sorbent sample is placed in the basket, the magnetic suspension balance is evacuated and the weight $M_1^0 = m^{met} + m_0^{sorb}$ vacuum is measured at a temperature of 25° C., where $m^{met}$ and $m_0^{sorb}$ represent the weights of the lifted metal parts and of the sorbent sample, respectively. Then, the system is filled with helium at a pressure of about 2 bar and the volume of the metal parts and the sorbent sample $V^{met} + V_0^{sorb}$ is obtained from the measured weight $M_1$ ($\rho_{He}^b$, T) and the density $\rho_{He}^b$:

$$V^{met} + V_0^{sorb} = \frac{M_1^0 - M_1(\rho_{He}^b, T)}{\rho_{He}^b}. \quad (1)$$

After evacuating it again, the cell is filled with oxygen and the weight $M_1$ ($\rho_{He}^b$, T) is measured at the desired conditions, i.e., density $\rho^b$ and temperature of 25° C.:

$$M_1(\rho^b, T) = M_1^0 + m^a - \rho^b[V^{met} + V_0^{sorb} + V^a], \quad (2)$$

where $m^a$ and $V^a$ are the absolute amount adsorbed and the volume of the adsorbed phase, respectively. The latter cannot be directly measured, and the only measurable quantity is the excess adsorption $\Gamma(\rho^b, T)$:

$$\Gamma(\rho^b, T) = m^a - \rho^b V^a = M_1(\rho^b, T) - M_1^0 + \rho^b[V^{met} + V_0^{sorb}]. \quad (3)$$

Figure 5:
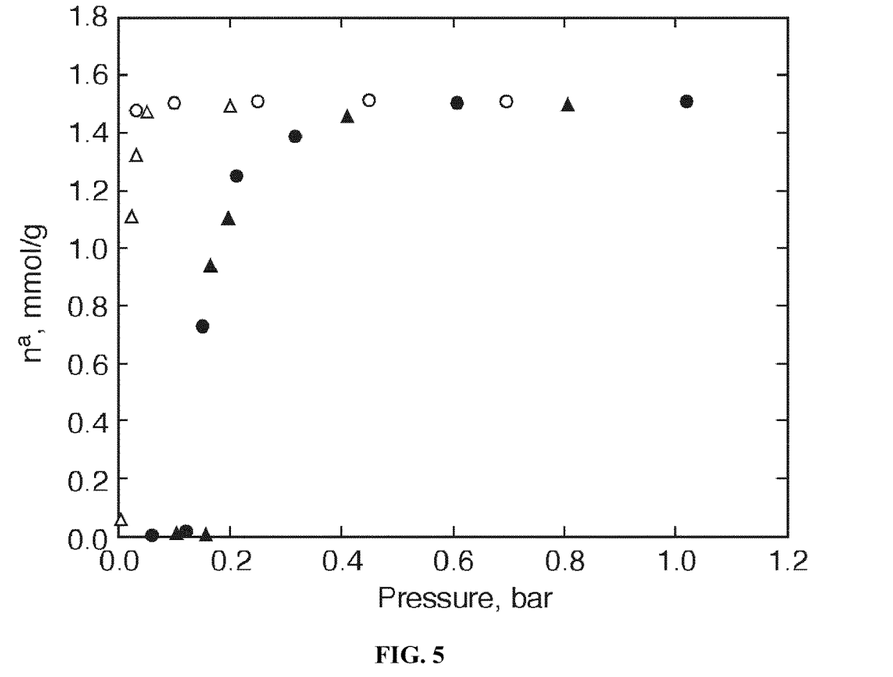
FIG. 5 represents oxygen adsorption and desorption isotherms for Co(salen) nanoparticles at 25° C. showing hysteresis (filled symbols refer to adsorption and empty symbols to desorption). Prior to the measurement, the sample was regenerated at two different temperatures: 60° C. (triangles) and 120° C. (circles).

However, since the densities at which the measurements are performed are relatively low, the term $\rho^b V^a$ is much smaller than $m^a$ and the absolute amount adsorbed can be approximated by the excess adsorption, $m^a \cong \Gamma$. Therefore, the experimental results are reported here in terms of the molar absolute adsorption $n^a$ defined as follows:

$$n^a(\rho^b, T) = \frac{\Gamma(\rho^b, T)}{M_m m_0^{sorb}}, \quad (4)$$

where
$m^a$ absolute adsorption in mass units [g]
$m_0^{sorb}$ initial weight of the sorbent sample [g]
$M_m$ molar mass of adsorbate [g/mol]
$m^{met}$ weight of the lifted metal parts [g]
$M_1$ weight at measuring point 1 [g]
$M_1^0$ weight at measuring point 1 under vacuum [g]
$n^a$ molar absolute adsorption per unit mass of sorbent [mmol/g]
P pressure [bar]
T temperature [K]
$V^{met}$ volume of lifted metal parts [cm$^3$]
$V_0^{sorb}$ volume of sorbent sample [cm$^3$]
$V^a$ volume of the adsorbed fluid [cm$^3$]
$\Gamma$ adsorption excess in mass units [g]
$\rho$ density [g/cm$^3$]
b bulk
He helium Consistent with other measurements, the unprocessed Co(salen) complex displayed no measurable binding of oxygen. In contrast, significant oxygen binding was observed for the Co(salen) nanoparticles, whose experimental data are given in Table 2. FIG. 5 shows the equilibrium oxygen adsorption isotherms on Co(salen) nanoparticles. Filled symbols refer to the experiments carried out in adsorption mode, whereas the empty symbols to the desorption runs. Prior to the measurements, the sample has been regenerated under vacuum at 60° C. (triangles) or at 120° C. (circles), but no difference in the measured isotherms has been observed. As shown in FIG. 5, the equilibrium oxygen adsorption isotherms display a sharp rise beyond 0.2 bar of oxygen pressure, attaining a saturation value of 1.51 mmol of $O_2$/g of nanoparticle at higher pressures—this change corresponds to a 5.1% mass increase based on the mass of the absorbent. In addition, this quantity of oxygen uptake corresponds to 98% of the stoichiometric amount predicted for [Co(salen)]$_2$O$_2$ complexes. The formation of this dimeric structural motif within the Co(salen) nanoparticles is consistent with what is known for O$_2$ adducts in other solid forms of Co(salen). See Suzuki et al., *Resonance Raman Spectra, Excitation Profiles, and Infrared Spectra of [Co(salen)$_2$]O$_2$in the Solid State*, Inorg. Chem. 20 1993-1996 (1981); Hester et al., *Resonance Raman Studies of Transition Metal Peroxo Complexes: 5-The Oxygen Carrier Cobalt(II)-salen and its μ-Peroxo Complexes, [L(salen)Co]$_2$O$_2$; L=DMSO, py, DMF, pyO, and no L*, J. Raman Spectroscopy 11 49-58 (1981); and Martell et al., *Bis-salicylaldehyde-imine Oxygen Carriers in Chemistry of the Metal Chelate Compounds*, Prentice Hall, Inc. New York, 339-352 (1952).

TABLE 2

Experimental Equilibrium Oxygen (O$_2$) Adsorption and Desorption Isotherms on Co(salen) Nanoparticles Measured at 25° C. Using Two Different Regeneration Temperatures

| $T_{reg}$ (° C.) | P (bar) | $n^a$ (mmol/g) |
|---|---|---|
| 60 | 0.103 | 0.002 |
|  | 0.155 | 0.003 |
|  | 0.164 | 0.934 |
|  | 0.198 | 1.096 |
|  | 0.411 | 1.45 |
|  | 0.807 | 1.495 |
|  | 0.2 | 1.488 |
|  | 0.051 | 1.469 |
|  | 0.031 | 1.322 |
|  | 0.023 | 1.106 |
|  | 0.004 | 0.049 |
| 120 | 0.06 | 0.001 |
|  | 0.12 | 0.018 |
|  | 0.15 | 0.728 |
|  | 0.212 | 1.251 |
|  | 0.317 | 1.39 |
|  | 0.607 | 1.504 |
|  | 1.019 | 1.512 |
|  | 0.697 | 1.512 |
|  | 0.449 | 1.516 |
|  | 0.249 | 1.513 |
|  | 0.1 | 1.504 |
|  | 0.031 | 1.481 |

The desorption isotherm of the Co(salen) nanoparticles is also shown in FIG. 5 and a lower O$_2$ pressure (0.005 bar) is required to completely desorb (less than sensitivity of instrument) the O$_2$ from the nanoparticles. The adsorption and desorption isotherms exhibit hysteresis, a property that has been observed previously for other Co(salen) systems. For instance, the five-coordinate Co(salen)(pyridine) complex also shows a hysteresis effect (see Hutson et al., *Synthesis and Characterization of the Sorption Properties of Oxygen-Binding Cobalt Complexes Immobilized in Nanoporous Materials*, Industrial Eng. Chem. Res. 39 2252-2259 (2000), which has been attributed to a restructuring of the crystal lattice during desorption (see Meier et al., *Tetrabutylammonium Tetracyanocobaltate(II) Dioxygen Carriers*, Inorg. Chem. 36 1707-1714 (1997) and Aymes et al., *Similar changes in phase were also observed in previous reports of Co(salen) and similar complexes*, J. Molecular Catalysis 18 315-328 (1983)).

Importantly, the oxygen binding properties of the Co(salen) nanoparticles are superior to other cobalt-based absorbents. An early report by Martell describes a mass change of between 3.5 and 4.5% after exposure to oxygen at room temperature for solid Co(salen). However there were no experimental details associated with the report. See Martell et al., Bis-salicylaldehyde-imine Oxygen Carriers in *Chemistry of the Metal Chelate Compounds*; Prentice Hall, Inc., New York, 1952 339-352. As another example, the crystalline phase of the four-coordinate complex, $(Bu_4N)_2Co(CN)_4$, was reported to adsorb oxygen, and the quantity taken up corresponded to 91% of the stoichiometric amount that is predicted for a 1:1 Co—$O_2$ complex. However, this material lost only 56% of its adsorbed oxygen while purging with $N_2$ at 30° C. (see Meier et al., *Tetrabutylammonium Tetracyanocobaltate (II) Dioxygen Carriers*, Inorg. Chem. 36 1707-1714 (1997)). The Co(salen) nanoparticles also outperformed five-coordinate Co(salen) complexes. These types of systems are known to have high affinities for $O_2$ in solution (see Li et al., *Separation of Oxygen from Air Using Coordination Complexes: A Review*, Industrial Eng. Chem. Res. 33 755-783 (1994)). Nonetheless, only 1.06 mmol of $O_2$/g of solid was taken up by Co(salen)(pyridine) complex 25° C. as measured by a static volumetric system (see Hutson et al., *Synthesis and Characterization of the Sorption Properties of Oxygen-Binding Cobalt Complexes Immobilized in Nanoporous Materials*, Industrial Eng. Chem. Res. 39 2252-2259 (2000)).

EXAMPLE 5

Active Center Structure and Enhanced Oxygen Binding

The structure and ligand environment of the Co(salen) nanoparticles and commercial Co(salen), investigated by the combined application of infrared, Raman, X-ray absorption near edge structure (XANES) and extended X-ray absorption fine structure (EXAFS) spectroscopies in conjunction with X-ray diffraction (XRD) experiments before and during interaction with oxygen. See Johnson et al., *Enhanced $O_2$ Binding in Co(salen) Nanoparticles: Characterization by In Situ Infrared and X-ray Absorption Spectroscopies*, J. Physical Chemistry C. 112:12272-12281 (2008), which is incorporated by reference. The results indicate that the enhanced oxygen binding properties of Co(salen) nanoparticles are related to structural differences between the unprocessed Co(salen) and the Co(salen) nanoparticles. The spectroscopy results indicate the presence of $Co^{II}$ centers with distorted tetrahedral geometry in the case of the Co(salen) nanoparticles and no evidence of metallic Co clusters, confirmed by the lack of Co—Co contributions at bonding distances in the EXAFS spectra and the presence of characteristic features of $Co^{II}$ in the XANES spectra. The EXAFS data also indicate that there are on average two Co—N and two Co—O bonds with a distance of 1.81±0.02 Å and 1.90±0.02 Å, respectively, consistent with typical metal salen structures. Upon oxygen binding on the Co(salen) nanoparticles, the XANES results indicate oxidation of the $Co^{II}$ to $Co^{III}$, consistent with the vibrational data showing new bands associated with oxygen species bonded to Co centers and the increase in the oxygen coordination number from 1.8 to 2.9 in the EXAFS data.

The oxygen uptake by the nanoparticulate Co(salen) is approximately 1.60 mmol of oxygen per gram of nanoparticles, a value that is consistent with one $O_2$ molecule per two Co(salen) complexes. The structural characterization results are consistent with this bridging stoichiometry. The XANES results showed that upon exposure to oxygen, the Co(salen) complexes within the nanoparticle are oxidized from $Co^{II}$ to $Co^{III}$, a result that is consistent with oxygen being reduced to a bridging peroxo moiety. Further, the EXAFS results on oxygen treated nanoparticles indicated an increase in coordination number of the Co complexes from four to five compared to the original, untreated samples. The Raman vibrational band that appears for the oxygen-exposed Co(salen) nanoparticles is in the region normally associated with bridging peroxo ligands to cobalt complexes, providing further complementary evidence for the 2 Co: 1 $O_2$ binding ratio.

In sum, the foregoing examples showed that Co(salen) nanoparticles, precipitated from organic solution using dense carbon dioxide as the antisolvent will exhibit reversible $O_2$ binding relative to the unprocessed Co(salen), which shows no measurable oxygen binding. The adsorbed oxygen is desorbed by a stream of flowing inert gas, such as $N_2$ or argon, at room temperature; in addition, heating above 30° C. accelerates the desorption. The stoichiometry of binding suggests an $O_2$ to Co(salen) ratio of 1:2 that is consistent with the formation of a bridging peroxo unit between two Co centers. This structure is a well-known motif for metal complexes in solution. See Borovik et al., *Dioxygen Binding and Activation: Reactive Intermediates* in *Activation of Small Molecules: Organometallic and Bioinorganic Perspectives*, Tolman, ed. Wiley-VCH, Weinheim 187-234 (2006). However, it is somewhat surprising for a solid-gas reaction and could be related to an unusual arrangement of molecules within the Co(salen) nanoparticles. Nevertheless, the nearly quantitative $O_2$ uptake and its reversible desorption illustrates the potential of these nanoparticles as sorbents for gases.

EXAMPLE 6

Nanoparticle Coating and Solid Supports

In this example, a $CO_2$-based coating technique was employed to assist with the deposition of the Co(salen) nanoparticles on a solid support. Because the PCA process may produce particle agglomeration due to the very fast precipitation kinetics, coating the nanoparticles on another material or support will help produce discrete deposited nanoparticles. Also, coating the nanoparticles helps to produce a heterogeneous material that is easier to handle for slurry or packed bed applications. Finally, coating the nanoparticles also can address the concern about the impact of release of the nanoparticles into the environment as the particles can be secured to a bulkier support.

One environmental benign medium to conduct the particle fluidization and coating is carbon dioxide. Carbon dioxide could be utilized to fluidize solids at pressures from ambient to supercritical. See Marzocchella et al., *Fluidization of solids with $CO_2$ at pressures from ambient to supercritical*, AIChE Journal 46 (5) 901-910 (2000). Carbon dioxide can produce thin, even, and solvent-free coatings. See Teipel et al., Microencapsulation of Particulate Materials, Powder Handling and Processing 13(3) 283-288 (2001); Vogt et al., *Coating of particles in a fluidized bed operated at supercritical fluid conditions*, Chemical Eng. & Tech. 27(9) 943-945 (2004). The tunability around the critical point allows the user to easily manipulate the density and solubility by minor changes in the system temperature or pressure. Operating at higher pressures also allows the reduction of surface tension and hence thin, and smooth coatings are possible. Supercritical carbon dioxide has also been utilized to coat nanoparticles. $BaTiO_3$ nanoparticles could be coated with amorphous alumina and still be recovered as a dry powder. See Aymonier et al., *Supercritical fluid technology of nanoparticle coating for new ceramic materials*, J. Nanoscience and Nanotechnology 5(6) 980-983 (2005). Previously, the present inventors have successfully utilized carbon dioxide for coating drugs for controlled release. See Subramaniam et al., Methods for a particle precipitation and coating using near-critical and supercritical antisolvents, USA (1998); Subramaniam et al., *Green Engineering ACS Symposium Series* 766, Green Process Concepts for the Pharmaceutical Industry, ed. P. T. Anastas, L. G. Heine, and T. C. Williamson 96-110 (2001). This coating process is similar to conventional air suspension coating using a Wurster coater design with air replaced by dense carbon dioxide gas. The core particles (or support) are suspended in carbon dioxide by fluidization and the solution containing the compound of interest is sprayed into the suspension similar to the PCA process. The carbon dioxide selectivity dries the solvent forming nanoparticles that are then deposited on the fluidized support.

In this example, Co(salen) was purchased from Sigma-Aldrich and used as received. ETHOCEL Standard 10 Premium (Ethyl Cellulose) was obtained from The Dow Chemical Company with an ethoxyl content around 48.6%. The Avicel microcrystalline cellulose (MCC) (FMC Corporation) starch beads (about 1.18 mm) were synthesized at the University of Kansas by Dr. John Haslam. Glass beads (1 to 2 mm) were obtained from Cataphote. Spherical γ-alumina beads of two different sizes (1.02 or 2.65 mm) were obtained from Sasol. The smaller γ-alumina beads have a BET surface area of 163 $m^2/g$, a packed bulk density of 0.8 g/mL, and a pore diameter of 12 nm. The larger γ-alumina beads have a BET surface area of 202 $m^2/g$, a packed bulk density of 0.54 g/mL, and a pore diameter of 15 nm.

The scanning electron microscope was used to probe the morphology of the nanoparticles on the support. Samples were scanned using a high resolution LEO 1550 field emission scanning electron microscope at an accelerating voltage of 5.0 kV. The typical procedure had to be modified to overcome charging problems due to poor conductivity. First, a few coated beads were placed directly onto a conductive carbon tab (Electron Microscopy Sciences Part No. 77825-12) attached to a 12 mm diameter aluminum specimen mount (Electron Microscopy Sciences Part No. 75190). Next, carbon graphite paint was applied around the base and sides of the bead leaving only a small section uncovered for analysis. This was done to improve conductivity and vastly improved the quality of the images. The sample was then dried gently in an oven at 65° C. It was then sputter-coated with a 30 nm thick Au—Pd (60:40) alloy coat by using a Hummer-2 (Technics) operating at 100 mTorr and 10 mAmps (9 volts).

Figure 6:
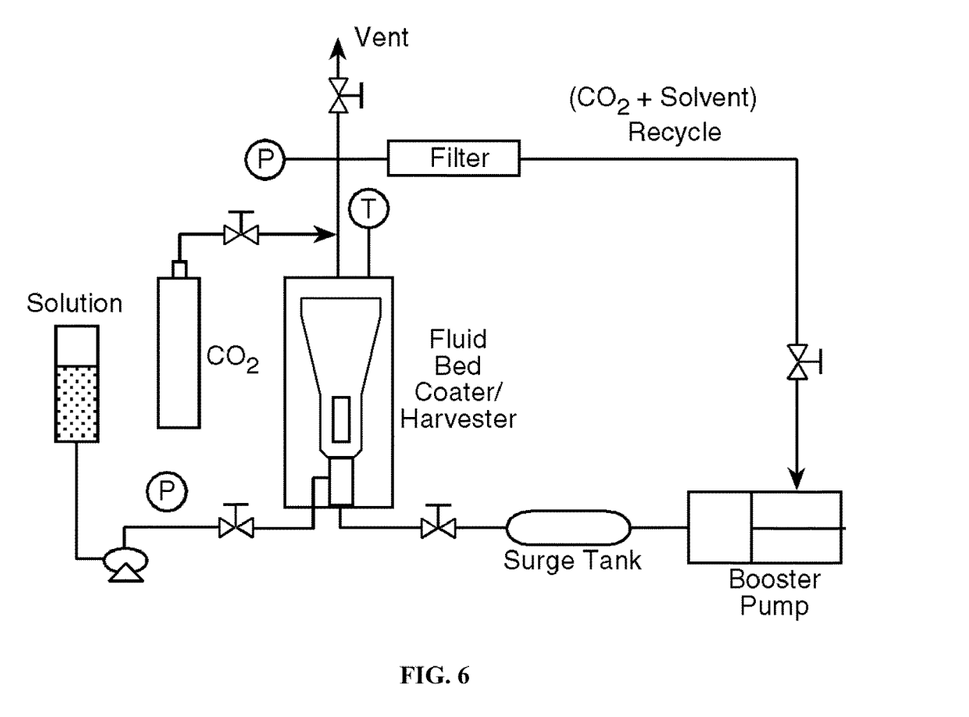
FIG. 6 shows the process schematic of fluidized bed nanoparticle coater.

The setup was constructed similar to previous work and is shown in FIG. 6. Initially, the core particles (or support) were charged into the coating vessel (2.5 L vessel from Thar Designs, Inc.). The core particles were suspended in $scCO_2$ by fluidization and the methylene chloride solution containing the compound of interest was sprayed into the suspension. A view window allowed the visualization of the fluidization. Both the supercritical carbon dioxide as well as solution were sprayed through a Vector coaxial nozzle (HCA-1033) (0.7 mm inner diameter) located below the glass insert fashioned in a Wurster design. The particles that result upon contact with $scCO_2$ were then deposited as a coating on the core particles as well as the glass insert itself. Either particle or film coatings can be obtained depending on the process conditions.

Fluidization velocities utilized and the internal glass column design was based on correlations. See Niu et al., *Particle fluidization with supercritical carbon dioxide: Experiments and theory*, Industrial & Eng. Chem. Research 46(10) 3153-3156 (2007). The minimum fluidization velocity was calculated using equation (2) for small particles.

$$Re_p = d_p u_{mf} \rho_1 / \mu \quad (1)$$

$$u_{mf} = \frac{d_p^2 (\rho_p - \rho_L)}{1650 \mu} g, \text{ valid for } Re_p < 20 \quad (2)$$

The terminal velocity was estimated using equation (3).

$$u_t = \left[ \frac{4}{225} \frac{(\rho_p - \rho_L)^2 g^2}{\rho_L \mu} \right]^{1/3} d_p,$$

valid in the following domain: $0.4 < Re_p < 500$ (3)

The density and viscosity of the carbon dioxide at the conditions of interest was calculated using G Flow Software (Barnant Company) that was also utilized for converting rotometer data on the PCA setup. For example, the density and viscosity of the carbon dioxide at 308 K and 71 bar is 0.183 g/mL and 0.0156 cP. The resulting terminal velocities in the experimental range utilized for the alumina beads (308 to 317 K and 64 to 72 bar) is 0.04 to 0.2 cm/s. The corresponding terminal velocities were estimated to be 6 to 9 cm/s.

To calculate the velocities experimentally, the carbon dioxide flow rate was measured with an Omega flowmeter was purchased (FMA-875-V-$CO_2$). The inner diameter of the inner cylinder was 15 mm. Initial experiments were conducted to find the carbon dioxide flow rate needed to fluidize the beads at 320 K and several different pressures (64 to 79 bar). The carbon dioxide flow rates were found to be 80 to 84 standard liters per min (SLPM) that corresponds to velocities in the range of 9.5 to 7.0 cm/s. These values are between the theoretical minimum fluidization velocity and the terminal velocity. Elemental Analysis (ICP) of the metal loading on the coated beads was carried out by Desert Analytics.

The initial experiments used the same Sonimist™ ultrasonic spray nozzle that was utilized for the PCA experiments. A Teflon® part was fabricated to connect the nozzle to the glass insert. However, after the first coating experiment with the glass beads, it was found that the fine capillary nozzle was damaged during fluidization. Therefore, it was decided to use the Vector nozzle.

It was also found that for some experiments, the beads were escaping from the glass insert and distributing below the nozzle at the bottom of the vessel. One hypothesis was that the carbon dioxide could be fluidizing the Teflon® insert as well allowing the beads to escape into the space between the nozzle and Teflon® insert. To overcome this obstacle, a clamp system was utilized. This system held together the three separate pieces, nozzle, Telfon®, and glass and solved the problem.

Beads were also found to escape out of the top of the glass insert as the velocity of some of the beads exceeded their terminal velocity. This was more problematic as the bead size decreased from 2 to 1 mm. Initially, the wire mesh was folded at the edges, externally covering the top of the insert. However, this mesh could be pushed open by the flow creating a gap for the beads to escape. Hence, the mesh was cut to the exact size to cover the top of the glass insert and an additional Telfon® ring was fabricated to place between the vessel cap and top of the glass insert to seal the mesh tight against the glass insert.

Initially, the Co(salen) was coated as nanoparticles on various substrates such as γ-alumina, glass, and microcrystalline cellulose ("MCC"). The coated beads produce a uniformly dark brown coloration, which is attributed to Co(salen) coverage. The coating appeared more uniform for the γ-alumina as the MCC coating showed some bare spots. The glass support yielded even lower coverage and was not tested further. Additionally, there was less agglomerization of beads when the γ-alumina support was used. The γ-alumina (γ-$Al_2O_3$) substrate was, therefore, chosen for further testing since it is also a more traditional catalyst support.

Next, the presence of a binding polymer, a layer between the support and coated material was investigated. Ethyl cellulose ("EC") was selected as the binding polymer since it is not soluble in carbon dioxide and has demonstrated permeability to light gases, including He, $O_2$, $N_2$, and $CH_4$. This polymer is normally added to decrease the smoothness of the core material in an effort to enhance the coating efficiency or amount coated on support per amount of material sprayed into solution.

Figure 7:
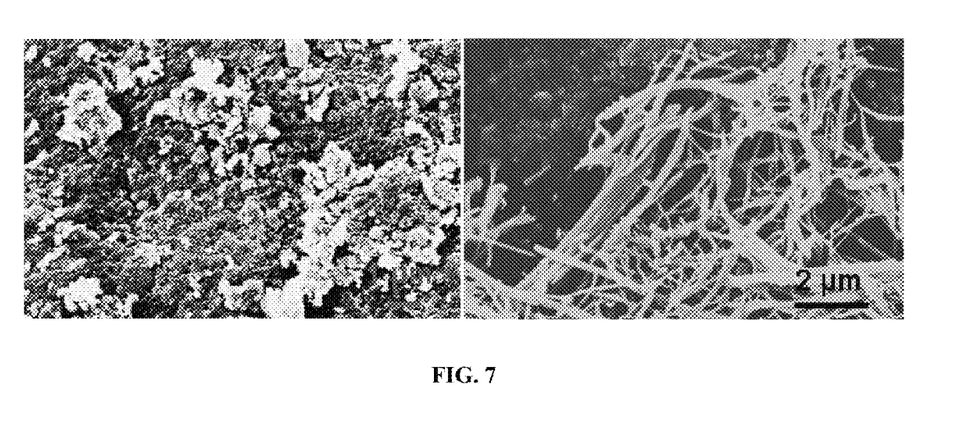
FIG. 7 shows an SEM image of Co(salen) coated directly on 2.65 mm γ-alumina (left) (313 K, 7.1 MPa), SEM image of Co(salen) coated on ethyl cellulose (right) (311 K, 6.7 MPa).

It has been previously demonstrated that the Co(salen) precipitates as nanorods when sprayed into compressed carbon dioxide. See Johnson et al., *Nanoparticulate Metal Complexes Prepared with Compressed Carbon Dioxide: Correlation of Particle Morphology with Precursor Structure*, J. Amer. Chem. Soc. 127 9698-9699 (2005); Subramaniam et al., U.S. Patent Application No. 2007/0134338, which are incorporated by reference. However, when the Co(salen) was sprayed directly onto the γ-alumina without a polymer layer present, discrete particles are not seen as shown in the left SEM micrograph FIG. 7; left image). In contrast, when a polymer layer such as ethyl cellulose is present, nanorods are observed (FIG. 7; right image). One explanation could be that the surface OH groups are interacting with the Cobalt metal, affecting how the salen molecules arrange themselves.

To characterize the coating, quantifying the presence of the Cobalt on the coated beads was carried out utilizing ICP analysis. The coating efficiency was calculated using similar notation to Krober et al., *Microencapsulation of particles using supercritical carbon dioxide*, Chem. Eng. and Processing 44 215-219 (2005). Both the inter-batch and intra-batch variability was examined. To check the intra-batch variability, several beads were selected at random from the same coating experiment and sent to Desert Analytics where the beads were decomposed by acid digestion and the amount of cobalt was analyzed. Different batch sizes from the same experiment were tested to analyze the variability of the coating process. For example three beads were tested for Run 8 (Co=0.069%) as one sample and ten beads for another sample (Co=0.070%).

The number of beads utilized for the coating experiment is found by weight based coating. Different batch sized were utilized and normalized to find the average value of each fresh bead ($m_o$). The amount of Co(salen) introduced during spraying was calculated from the initial concentration as well as the flowrate and duration of spraying. The average theoretical coating ($m_t$) is then calculated by dividing the mass of Co(salen) sprayed by the number of uncoated beads ($m_o$).

From the ICP data, the mass and number of the beads analyzed, and the amount of Cobalt per each complex (17%) one can calculate the amount of Co(salen) coated on each bead ($m_a$). This calculation is made with the assumption that coating is uniformly distributed on each bead tested. The coating efficiency and (E) and loading (L) are estimated from the following equations.

$$E \equiv \frac{m_a}{m_t} \quad (1)$$

$$L \equiv \frac{m_a}{m_a} \quad (2)$$

As can be seen in Table 3, initial results appear to indicate that the presence of the ethyl cellulose binding polymer does double the amount of Cobalt loading. The ethyl cellulose apparently improves the adhesion of the complex to the alumina. It appears the smaller beads yield higher Cobalt loadings when comparing the same amount of sample weight. The coating efficiency values are low when compared to other reports of coatings performed in carbon dioxide. Nevertheless, this example demonstrates that molecule based nanoparticles can be coated for practical application.

TABLE 3

Quantitative amount of coating on alumina beads

| Sample | Sample mass tested (mg) | % Co in each sample | Avg. Amount of Co per bead (mg) | Loading (%) | Coating Efficiency (%) |
|---|---|---|---|---|---|
| 2.65 mm alumina with EC | 29.51 | 0.069 | 0.007 | 0.4 | 19 |
| 2.65 alumina | 29.94 | 0.033 | 0.003 | 0.2 | 8 |
| 1.02 mm alumina | 29.31 | 0.135 | 0.001 | 0.8 | 8 |

EXAMPLE 7

Separation Process (prophetic)

In this example, a proposed separation process for the removal of oxygen from a gaseous mixture is proposed. Since, in the case of air, nitrogen is the only other primary component, the present invention is also useful for the recovery of nitrogen and nitrogen-enriched air.

In general, a gaseous feed stream containing oxygen and other components (such as nitrogen) is brought into contact with an absorber section, such as a column or packed bed having the nanoparticulate solid transition metal complex absorbent contained therein, preferably on a solid support. The feed stream may be operated in either continuous or batch mode. The feed stream input may be measured and controlled by a valve, flow meter, or regulator on the feed stream side of the absorber section. The absorber section is maintained at temperature less than about 100° C., and more preferably at a temperature less than about 90, 80, 70, 60, 50, 40, 30, or 25° C., most preferably at about room temperature. The feed stream passes through the absorber section and leaves as an oxygen-depleted stream for further use or disposal. After a sufficient period of time, oxygen from the feed stream is absorbed by the absorbent section. The oxygen is then desorbed by either increasing the temperature of the absorber section and/or degreasing the pressure therein. The lower pressure may be maintained by any suitable means, for example a vacuum pump equipped with a regulator.

Figure 8:
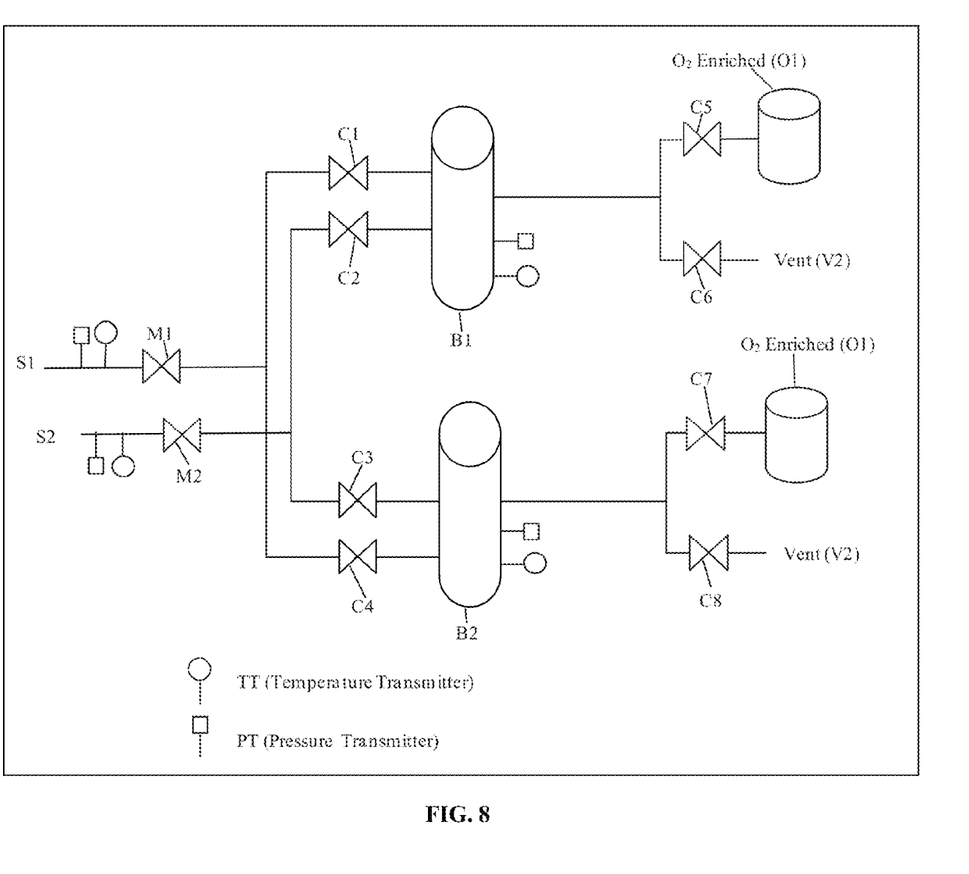
FIG. 8 is an exemplary schematic showing how the nanoparticles of the present invention can be used to absorb and/or desorb from a gaseous feed stream.

FIG. 8 illustrates an exemplary schematic in which employs a pair of fixed bed absorbers B1, B2, in which the nanoparticles are packed. In general, the absorbers B1, B2 are operated cyclically such that when one is adsorbing oxygen from a oxygen-containing stream, the other is being flushed with an inert gas (such as nitrogen) at sufficiently high temperature and pressure to desorb the oxygen adsorbed in the previous cycle and produce an oxygen-enriched stream in the effluent. In this example, each absorber B1, B2 has independent pressure controls (illustrated by the box) and temperature controls (illustrated by the circle).

Two streams are connected to the fixed bed absorbers B1, B2. The first stream S1 is gaseous feed stream comprising oxygen (e.g., air or non-air). The other stream S2 is a purge gas stream, such as nitrogen. The overall flow of the gaseous feed stream S1 is controlled by metering valve M1, and the flow of gaseous feed stream S1 to each of the beds B1, B2 is controlled by corresponding control valves C1, C4. The overall flow of the purge gas stream S2 is controlled by metering valve M2, and the flow of purge gas stream S2 to each of the beds B1, B2 is controlled by corresponding control valves C2, C3. It will be appreciated that four-way valves can be used in the place of the control valves C1, C2, C3, C4 if so desired. Located downstream from the beds B1, B2 are four corresponding effluent control valves C5, C6, C7, C8 for collecting the oxygen-enriched stream and oxygen-depleted streams exiting from the absorber beds B1, B2.

During operation, the beds B1, B2 cycle between operating as absorber and desorber units. For example, during the first part of the cycle, bed B1 operates as an oxygen-absorber while bed B2 operates as an oxygen desorber. More specifically, when control valve C1 is open and control valve C2 is closed, the gaseous feed gas stream S1 enters bed B1. An oxygen-depleted effluent is vented or otherwise collected by opening control valve C6 and closing control valve C5. Meanwhile, when control valve C3 is open and control valve C4 is closed, the purge gas stream S2 enters bed 132. An oxygen-enriched effluent is collected by opening control valve C7 and closing control valve C8.

During the second part of the cycle, the process is reversed. Bed B1 operates as an oxygen desorber while bed B2 operates as an oxygen absorber. More specifically, when control valve C1 is closed and control valve C2 is open, the purge gas stream S1 enters bed B1. The bed is operated as a sufficient temperature to desorb the oxygen absorbed by B1 in the previous part of the cycle. The oxygen-enriched effluent is collected by opening control valve C5 and closing control valve C6. Meanwhile, control valve C3 is closed and control valve C4 is open, the feed gas stream S1 enters bed B2. Oxygen is absorbed in B2, and an oxygen-depleted effluent is vented or otherwise collected by opening control valve C8 and closing control valve C7.

From the foregoing, it will be seen that this invention is one well adapted to attain all ends and objectives herein-above set forth, together with the other advantages which are obvious and which are inherent to the invention. Since many possible embodiments may be made of the invention without departing from the scope thereof, it is to be understood that all matters herein set forth are to be interpreted as illustrative, and not in a limiting sense. While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A process for removing oxygen from a non-air gaseous system comprising oxygen, said process comprising the steps of:
   providing a transition metal complex selected from the group consisting of a transition metal complexed with a salen, saltin, salophen, or salcyhexen ligand;
   forming a solution including at least one solvent and said transition metal complex;
   spraying said solution containing said at least one solvent and transition metal complex through a nozzle into an antisolvent;
   generating atomized droplets of said solution; and
   contacting droplets with the antisolvent to form a nanoparticulate solid transition metal complex absorbent;
   exposing said gaseous system to said nanoparticulate solid transition metal complex absorbent, wherein said absorbent is capable of absorbing oxygen, at a temperature less than about 100° C.

2. The process according to claim 1 wherein said temperature is less than about 50° C.

3. The process according to claim 1 wherein said temperature is at about room temperature.

4. The process according to claim 1 wherein said nanoparticulate solid transition metal complex absorbent is a nanoparticulate Co(II) salen complex produced by precipitation from an organic solution with a compressed anti-solvent, in which supercritical carbon dioxide is used as the anti-solvent.

5. The process according to claim 1 wherein said metal complex is a nickel, cobalt, iron, or ruthenium salen.

6. The process according to claim 1 wherein said nanoparticulate solid transition metal complex absorbent has a particle morphology comprising rods.

7. The process according to claim 1 wherein said nanoparticulate solid transition metal complex absorbent has a tetrahedral-like molecular geometry.

8. The process according to claim 1 wherein said nanoparticulate solid transition metal complex absorbent comprises a metal salen complex.

9. The process according to claim 6 wherein said rods have an average diameter of about 85 nm and an average length of about 700 nm.

10. The process according to claim 1 wherein said nanoparticulate solid transition metal complex absorbent is a cobalt salen complex capable of absorbing about one oxygen molecule per two cobalt salen complex molecules.

11. The process according to claim 1 said nanoparticulate solid transition metal complex absorbent absorbs about 5 wt % oxygen based on the overall weight of the nanoparticulate solid transition metal complex absorbent.

12. A process for regenerating a nanoparticulate solid transition metal complex absorbent having oxygen absorbed thereon comprising:
   providing a nanoparticulate solid transition metal complex absorbent having oxygen absorbed thereon, said absorbent formed by a process comprising the steps of providing a transition metal complex selected from the group consisting of a transition metal complexed with a salen, saltin, salophen, or salcyhexen ligand;

forming a solution including at least one solvent and said transition metal complex;

spraying said solution containing said at least one solvent and transition metal complex through a nozzle into an antisolvent;

generating atomized droplets of said solution; and contacting droplets with the antisolvent to form said nanoparticulate solid transition metal complex absorbent;

and then performing a step selected from the group consisting of:

(a) heating said absorbent at a pressure less than about 5 bar, (b) decreasing the pressure of the absorbent to about 0.01 bar or less at a temperature of 120° C. or less, or (c) purging the absorbent with an inert gas;

wherein said steps (a), (b), or (c) decrease the amount of oxygen absorbed by the nanoparticulate solid transition metal complex absorbent.

13. The process according to claim 12 wherein said nanoparticulate solid transition metal complex absorbent is a nanoparticulate Co(II) salen complex produced by precipitation from an organic solution with a compressed anti-solvent, in which supercritical carbon dioxide is used as the antisolvent.

14. The process according to claim 12 wherein said nanoparticulate solid transition metal complex is a nickel, cobalt, iron, or ruthenium salen.

15. The process according to claim 12 wherein said nanoparticulate solid transition metal complex is selected from the group consisting of a transition metal complexed with a salen, saltin, salophen, or salcyhexen ligand.

16. The process of claim 12 wherein said nanoparticulate solid transition metal complex absorbent having oxygen absorbed thereon is purged with an inert gas comprising nitrogen or argon.

17. The process of claim 12 wherein said nanoparticulate solid transition metal complex absorbent absorbs about 3 to 5 wt % oxygen based on the absorbent mass.

18. The process of claim 12 wherein said nanoparticulate solid transition metal complex is heated to a temperature between 30° and 100° C.

19. A process for removing oxygen from a gaseous feed stream containing oxygen and at least one other component, said process comprising bringing said gaseous feed stream containing oxygen into contact with a solid state composition comprising a nanoparticulate solid transition metal complex absorbent, such that said absorbent selectively and reversibly binds oxygen thereby removing oxygen from the gaseous feed stream; and increasing the temperature of the nanoparticulate solid transition metal complex absorbent, decreasing the pressure or the partial pressure of the oxygen in the gas flowing past the nanoparticulate solid transition metal complex absorbent, purging the nanoparticulate solid transition metal complex absorbent with a purge gas stream, or a combination thereof in order to release at least a portion of said oxygen from said absorbent and wherein said nanoparticulate solid transition metal complex absorbent is formed by a process comprising providing a transition metal complex selected from the group consisting of a transition metal complexed with a salen, saltin, salophen, or salcyhexen ligand;

forming a solution including at least one solvent and said transition metal complex;

spraying said solution containing said at least one solvent and transition metal complex through a nozzle into an antisolvent;

generating atomized droplets of said solution; and contacting droplets with the antisolvent to form said nanoparticulate solid transition metal complex absorbent.

20. The process of claim 19 wherein said gaseous feed stream is brought into contact with a first absorber bed having said nanoparticulate solid transition metal complex absorbent therein; and wherein said first absorber bed is subsequently purged with said purge gas stream which is an inert gas.

21. The process of claim 19, wherein said gaseous feed stream is brought into contact with a first absorber bed having said nanoparticulate solid transition metal complex absorbent contained therein to remove oxygen from said gaseous feed stream therein and wherein a purge gas stream is brought into contact with a second absorber bed having said nanoparticulate solid transition metal complex absorbent contained therein; and then wherein said gaseous feed stream is brought into contact with said second absorber bed having said nanoparticulate solid transition metal complex absorbent contained therein and wherein said purge gas stream is brought into contact with said first absorber bed having said nanoparticulate solid transition metal complex absorbent contained therein to desorb oxygen removed from said nanoparticulate solid transition metal complex absorbent in said first absorber bed.

\* \* \* \* \*